United States Patent [19]
Hoesch

[11] Patent Number: 6,159,401
[45] Date of Patent: Dec. 12, 2000

[54] CEMENTITIOUS PRODUCTS

[75] Inventor: Wolfgang Hoesch, Bischofsheim/Rhön, Germany

[73] Assignee: Entwicklungsgesellschaft Wolfgang Hoesch Gdbr, Germany

[21] Appl. No.: 08/988,893

[22] Filed: Dec. 11, 1997

[51] Int. Cl.$^7$ ...................................................... B28B 3/00
[52] U.S. Cl. .................... 264/69; 264/333; 264/DIG. 43; 106/738
[58] Field of Search ............................ 264/333, DIG. 43, 264/69; 106/738, 753

[56] References Cited

U.S. PATENT DOCUMENTS

| | | | |
|---|---|---|---|
| 3,694,128 | 9/1972 | Foxen | 425/412 |
| 3,940,229 | 2/1976 | Hutton | 425/304 |
| 4,915,888 | 4/1990 | Sato | 264/71 |
| 4,981,626 | 1/1991 | Uchizaki | 264/23 |
| 5,061,172 | 10/1991 | Fennessy, Sr. | |
| 5,173,233 | 12/1992 | Kafarowski | 264/113 |
| 5,330,694 | 7/1994 | Iwaya | 264/112 |
| 5,389,172 | 2/1995 | Kobayashi et al. | 156/155 |

FOREIGN PATENT DOCUMENTS

| | | |
|---|---|---|
| 0 570 038 A1 | 11/1993 | European Pat. Off. . |
| 0 605 096 A1 | 7/1994 | European Pat. Off. . |
| 0 759 346 A1 | 2/1997 | European Pat. Off. . |
| 2029239 | 10/1970 | France . |
| 428129 | 4/1926 | Germany . |
| 31 09 108 A1 | 9/1982 | Germany . |
| 296 07 260 U1 | 6/1998 | Germany . |
| 4-201510 | 7/1992 | Japan . |
| 7-164420 | 6/1995 | Japan . |
| 1048096 | 11/1966 | United Kingdom . |
| 1267892 | 3/1972 | United Kingdom . |
| 1284712 | 8/1972 | United Kingdom . |
| 2 277 536 | 11/1994 | United Kingdom . |
| 2 278 567 | 12/1994 | United Kingdom . |

OTHER PUBLICATIONS

Patent Abstracts of Japan, 04–201510, Jul., 1992.
Patent Abstracts of Japan, 07–164420, Jun., 1995.
Patent Abstracts of Japan, 09–076214, Mar., 1997.

*Primary Examiner*—Paul Marcantoni
*Attorney, Agent, or Firm*—Killworth, Gottman, Hagan & Schaeff LLP

[57] ABSTRACT

A cementitious product has an exposed surface finish which is applied during formation of the product by a pressing process and which simulates the surface and aspect of natural stone provided by secondary processing.

12 Claims, 8 Drawing Sheets

CEMENTITIOUS PRODUCTS

FIELD OF THE INVENTION

This invention relates to cementitious products, more particularly but not exclusively for use in, and for, the building, construction and civil and structural engineering industries.

BACKGROUND OF THE INVENTION

Cementitious products, such as masonry, paving, paving flags, paviours, flagstones, blocks, bricks, tiles, slates, posts, lintels, sills, slabs and panels and claddings and linings for walls, ceilings, roofs and floors have been made for many years by pressing or moulding processes. Hereinafter such pressing or moulding processes will be generically referred to for convenience as "pressing". Cementitious products are typically made of a cementitious mix of water, cement, sand, aggregate, filler, etc., with or without a colouring pigment. Instead of pigment, the aggregate itself may provide colour to the cementitious product.

A typical pressing process involves the use of what is commonly known as a static block making machine. Pallets made from metal or wood are fed by a conveying means into the block making machine which comprises a mould, a cementitious mix (concrete) filling means, one or more compacting devices, optional vibration devices, a stripping device, and an outgoing conveying means. The pallet, which forms the profile of one side of the block, is located under the mould in the machine. The mould comprises one or more side walls each defining a side of the desired block, and preferably the compacting and stripping device forms the final side of the block. Once the pallet has been located, the mould is lowered on to the pallet and held in frictional contact to define a mould cavity comprising the upper surface of the pallet, and the surfaces of the side walls of the mould.

The mould cavity is then filled with a cementitious mix (concrete) of the desired composition optionally using vibration or other levelling means to achieve a desired profile of concrete. A compacting head, which preferably will also be used for stripping, is then lowered on to the upper surface of the concrete in the mould cavity and the concrete is compacted by the force exerted by the compacting head, such force being direct pressure and/or vibration. Optionally, the mould cavity is then filled with a second cementitious mix (concrete) of another desired composition again optionally using vibration or other levelling means to achieve a desired profile of cementitious mix (concrete). A compacting head, which preferably will also be used for stripping, is then lowered on to the upper surface of the concrete in the mould cavity and the concrete is compacted by the force exerted by the compacting head, such force being direct pressure and/or vibration. The use of two filling operations allows the manufacture of a block which primarily comprises a strong cost effective non visible layer in use and a more pleasantly aesthetic visible layer in use that may contain more expensive ingredients.

The compacting forces are stopped and the mould is then raised from the pallet with both the pallet and the compacting head, now acting as a stripping device, being held in stationary alignment. When the mould has been raised clear of the green concrete block the compacting/stripping head is also raised clear of the green concrete. The formed green block of cementitious mixture (concrete) is then conveyed out of the block making machine on the pallet on which it was formed.

Optionally, the formed green concrete block on its pallet is conveyed into a secondary processing area, such as a washing station, to effect an exposed aggregate finish and then into an area where it is allowed to cure to a hardened state. Having cured to a sufficiently hardened strength the block is then conveyed on the pallet to a depalleting station. The depallated block is then optionally transported to another secondary processing area where it is subjected to the action of secondary processing apparatus such as a shotblasting machine, bush hammer, chain flailer or the like and thence into an area where it is packaged for delivery. In some cases the depalleted blocks are put into yard storage for a period to time before returning to a secondary processing area. The pallet is conveyed back into the block making machine and the making cycle restarts. Many other presses, pressing processes, apparatus and machinery and secondary processes and processing machinery, other than those described, are available. By way of example, hermetic pressing machines, hydraulic pressing machines that require no vibration, hammer action presses, presses using stamper plates, and presses with roller action are all used to make the same product type.

Conventionally, the compacting and stripping device employs a hard pressing shoe, also known as a stripper shoe, made from a metal or other hard or unyielding material, which alone acts on the cementitious mix (concrete) contained within the mould. The effect of the action of the shoe on the cementitious mix in the mould cavity is shown diagrammatically and to an enlarged scale in FIGS. 1 and 2 of the accompanying drawings to which reference will now be made. In FIG. 1, an upper shoe 1 is shown in the position in which it is pressing against an initially compacted charge of cementitious mix 2 in a mould cavity 3 which in turn further compacts the charge of cementitious mix by pressing it against a pallet (not shown). The cementitious mix 2 includes fine particles (sand and cement), so-called "fines" 4, and coarser particles of varying sizes made of a suitable aggregate 5 such as gravel or stone chippings.

As will be apparent from FIG. 1, the action of the unyielding shoe 1 has the effect of forcing the aggregate particles 5 downwards, as indicated by the illustrated arrows 7 and the fines 4 to move upwardly with respect to and around, the coarser aggregate particles 5, as indicated by the arrows 6, so that in the formed green cementitious product 8 shown in FIG. 2, the aggregate particles 5 lie beneath the upper surface 9 which is formed of fines 4 and which presents the exposed surface of the product in use.

Moreover, because the pallet is also made of unyielding material, the lower surface 10 of the cementitious product 8 also ends up being formed of fines 4. Whilst surfaces made of fines are perfectly satisfactory for so-called "commodity" walling blocks whose surfaces may be covered in use, this is certainly not the case with cementitious architectural masonry products such as paving flags and blocks which present at least one exposed surface for view and for wear. If cementitious products having exposed surfaces formed of fines are used, then not only are these surfaces unsightly, but they are more subject to wear which reduces still further their aesthetic appearance.

Accordingly, with cementitious products which in use have at least one exposed surface, it has become desirable to provide the exposed surfaces with surface finishes that are not only aesthetically pleasing but also may be more resistant to wear.

DESCRIPTION OF THE PRIOR ART

The surface finish can be applied during pressing in the mould cavity by providing the shoe and/or pallet with a patterned non-metallic surface which pattern can be reproduced again and again, as disclosed in Gebrauchsmuster DE 296 07 260.5 U1. Moreover, in the hermetic pressing machines referred to hereinabove which utilize a hard rubber mat on the pallet to seal the mould cavity, the surface of the rubber mat facing the mould cavity may be similarly provided with a pattern. Alternatively, the surface finish is applied to the cured cementitious product by secondary processing.

In secondary processing, the general idea is to remove the surface fines to the extent that more attractive aggregate particles are exposed, ie become a visible part of the exposed surfaces. This has hitherto been achieved in a variety of ways down the years and the patent literature is testament to this (see, for example, DE 142 396; DE 372018A; GB 588,477, U.S. Pat. No. 3,575,155 and EP 0 666,372A). In addition to grinding and polishing which, by definition, produce smooth exposed surfaces, secondary processing also involves the production of surfaces which simulate the effect of natural stone. Such simulated surfaces have been, and still are being, produced by shot blasting, hammering, bush hammering, water jets, striking, flailing, chain flailing, cutting, cutting using knives or metal spikes, milling and the use of eccentric weights.

All these secondary processes are expensive, not only in time and labour but also in material wastage. But there is the added disadvantage of secondary processing being environmentally unfriendly as it can create large amounts of dust bringing with it the ever present danger of dust inhalation unless protective masks are worn and it can use excessive amounts of water creating undesirable environmentally unfriendly waste.

SUMMARY OF THE INVENTION

Therefore, it is an object of the present invention to provide a cementitious product with a surface finish which provides the exposed surfaces with visible aggregate particles which would normally be obtained by secondary processing but which overcomes or at least substantially reduces the aforementioned disadvantages.

To this end, and in accordance with one aspect, the present invention resides in a cementitious product having an exposed surface finish which is applied during formation of the product by a pressing process and which simulates the surface and aspect of natural stone provided by secondary processing.

Expressed in another way, the invention resides in a cementitious product having an exposed surface including visible aggregate particles, the said exposed surface being provided by a pressing process during formation of the product.

From another aspect, the invention resides in a method of manufacturing a cementitious product having an exposed surface finish, characterised in that the said surface finish is applied during formation of the product by a pressing process and simulates the surface and aspect of natural stone provided by secondary processing.

Yet another aspect of the invention resides in a method of manufacturing a cementitious product from a cementitious mix including fine particles comprising sand and cement and coarser particles comprising an aggregate, characterised by forming the cementitious mix in such manner that the formed cementitious product has an exposed surface finish provided during forming in which coarser particles stand proud of the fine particles.

By means of the invention, all the disadvantages and cost penalties attendant upon secondary processing for producing a surface finish which simulates the surface and aspect of natural stone are completely avoided.

Preferably, the surface finish is applied by pressing a flowable mass against a surface of a cementitious mix including aggregate, the action of the flowable material causing aggregate particles to be exposed and provide an exposed surface finish which includes visible aggregate particles.

The action of the flowable mass has the effect of "cleaning" the surface fines off the aggregate particles adjacent to the surface so that the cleaned aggregate particles stand proud, and form a visible part, of the exposed surface.

Thus, the invention may further be expressed in terms of a cleaning operation to which end an exposed surface finish is provided on a cementitious product comprising sand and cement fine particles, aggregate coarse particles and water by cleaning fine particles from coarse particles during forming of the product.

From a further aspect, the present invention resides in a pressing apparatus for making cementitious products from a cementitious mix, said pressing apparatus including pressing shoe and pallet members, at least one of which includes a flowable mass which presents a pressing surface for engagement with a surface of the cementitious mix during formation of the cementitious product.

Although not strictly necessary, in order to present substantially the same relatively planar pressing surface to the surface of the mix, the flowable mass is preferably resilient so that its pressing surface returns substantially to its original shape after each pressing operation. Expressed in another way, the resilient flowable mass could be described as resiliently deformable.

If desired or necessary to avoid constituents of the mix adhering to the flowable mass and possibly reducing product quality by interfering with the action of the flowable mass on the surface of the mix, action may be taken to clean, as by a sweeping action or by the use of air such as provided by an air knife, for example, the surface of the flowable mass after each pressing operation.

The flowable mass may be made of any suitable flowable, resilient, deformable or elastic material consistent with providing the requisite flow characteristics to achieve the "cleaning" effect to expose the surface aggregate particles. Plastics, synthetic and natural rubber and elastomeric materials may be used and Applicants have found that polyurethane is particularly advantageous.

The flowable mass may be in the form of a discrete body, eg a block or sheet, or in layer form of one or more materials (laminated mass), which advantageously is incorporated into either of the pressing shoe or pallet members. In order to facilitate the cleaning effect on the aggregate particles along the mould cavity walls, the flowable mass may have an inwardly facing bevel extending around its outer periphery. Alternatively Applicants have found that the use of a different material or mass that is bondable with the flowable mass in the peripheral region to that of the rest of the mass avoids the need to incorporate such a bevel.

Applicants have also found that the action/flow characteristics of the flowable mass may be improved by the use of a composite material, for example by constructing the flowable material in layer form of one or more materials such that various beneficial properties are imparted by each of the materials employed.

Alternatively, instead of being a discrete body, the flowable mass may be constituted by a fluid, for example a gas, liquid, gel such as a silicone or particulate material such as sand which is contained in a flexible membrane such as a film of a suitable plastics material.

BRIEF DESCRIPTION OF THE DRAWINGS

In order that the invention may be more readily understood, reference will now be made, by way of example, to the accompanying drawings, in which.

DETAILED DESCRIPTION OF THE PREFERRED EMBODIMENTS

Figure 1:
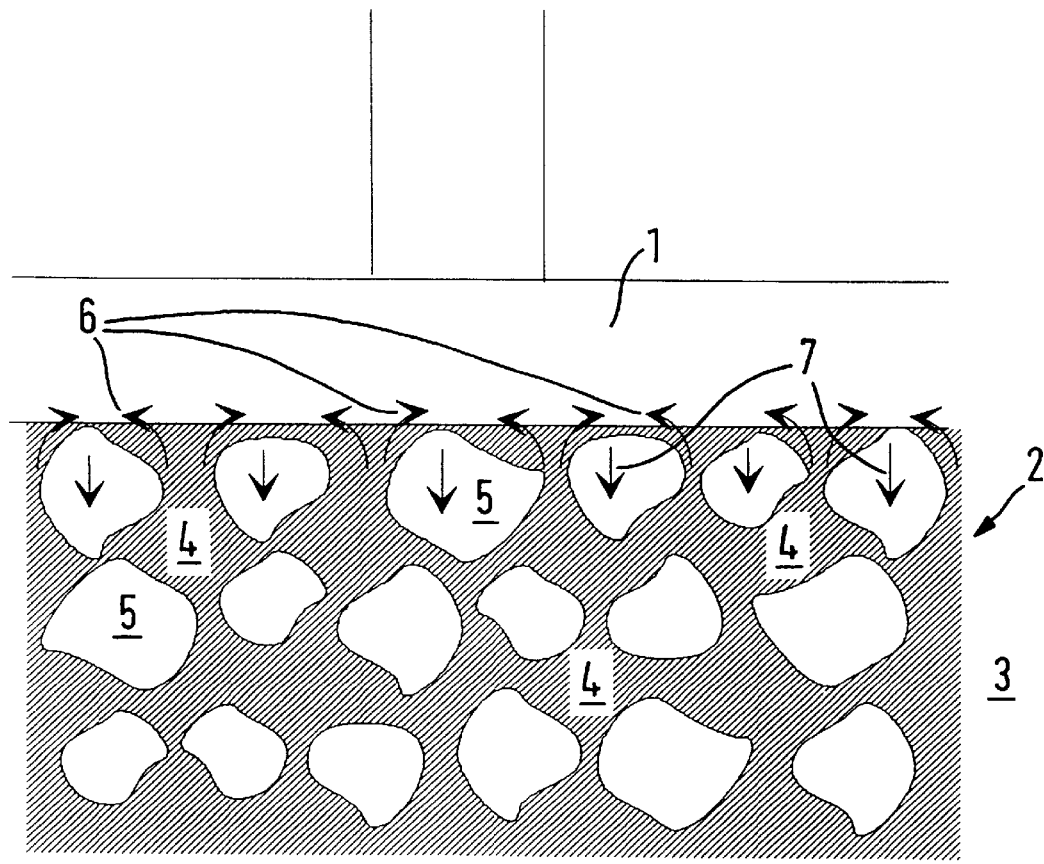
FIGS. 1 and 2 are diagrammatic sectional views, to an enlarged scale, through a charge of cementitious mix in a mould cavity and showing the action a normal shoe of a known pressing process on the mix.
Figure 2:
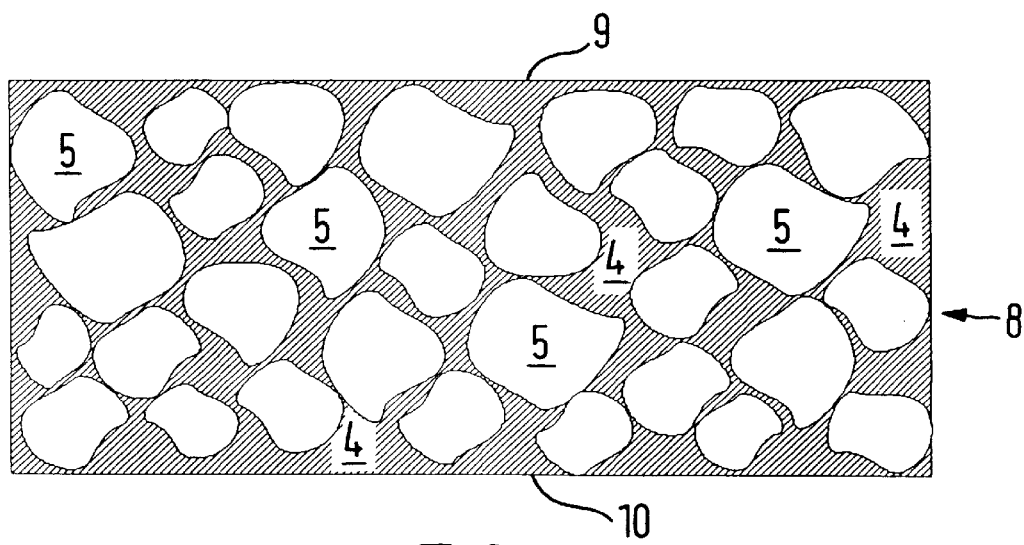
Figure 3:
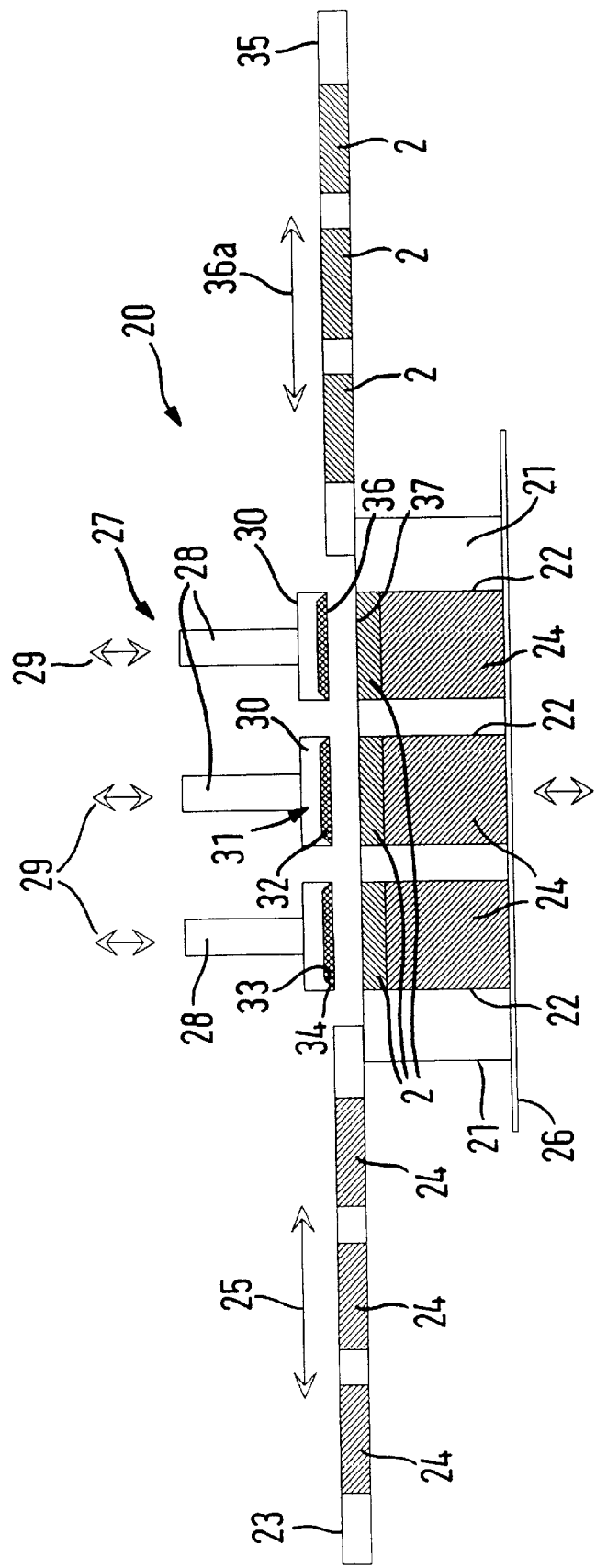
FIG. 3 is a schematic view of a pressing apparatus for making cementitious paving products in accordance with the invention.

Referring to FIG. 3 there is shown a pressing apparatus for making cementitious paving products which is generally indicted at 20. The pressing apparatus 20 comprises a mould frame 21 which in this diagrammatic representation defines three cavities 22. The mould frame 21 is closed at its lower surface by a pallet 26 which is held under pressure in frictional contact. The pressing apparatus 20 also includes a feed drawer 23 which receives a first charge of cementitious mix 24 comprising water, sand and cement and coarser aggregate particles from a feed hopper (not shown). The feed drawer 23 is reciprocable in the directions of arrow 25 between positions under the feed hopper (not shown) and in alignment with the mould cavities 22 such that the first cementitious mix 24 is transferred via the feed drawer 23 into the mould cavities 22.

Optionally, the cementitious mix 24 also includes an admixture comprising one or more of a water proofer, fungicide, plasticiser, air entrainer and the like.

The pressing apparatus also comprises a series of compacting/stripping heads 27 which are of piston like construction with a piston plunger 28. The piston plungers 28 are substantially vertically moveable in the directions of the illustrated arrows 29 into and out of positions in which they exert a pressing action on the first cementitious mix 24, as will be appreciated from FIG. 4. Each plunger 28 has a metal holder 30 defining a recess 31 which accommodates, and retains, a flowable mass constituted by a pressing/stripper shoe 32 formed of a block of a resilient flowable material, such as polyurethane.

The pressing shoe 32 contacts and optionally exerts a moderate compacting pressure on the first mix 24 in the mould cavity 22, and/or vibration is applied to the pallet 26, such that the level of the cementitious mix 24 in the cavity is sufficiently low to provide space for a second and final cementitious mix 2. The metal holder recess 31 of the metal holder 30 is outwardly flared as indicated at 33 and the shoe 32 has a complementary inwardly directed peripheral bevel 34 so that the entire upper surface 37 of the mix 2 (FIG. 4) is contacted by the lower surface 36 of the pressing shoe 32.

A further feed drawer 35 is included in the pressing apparatus 20 and receives a second charge of cementitious mix 2 comprising water, sand and cement (fines) 4 and coarser aggregate particles 5 from a feed hopper (not shown). The feed drawer 35 is reciprocable in the directions of arrow 36a between positions under the feed hopper (not shown) and in alignment with the mould cavities 22 such that the second cementitious mix is transferred via the feed drawer 35 and into the mould cavities 22 where it lies on top of the first mix 24 as will be appreciated from FIG. 4 in which line 2a indicates the position of the boundary between the two mixes 2 and 24. Like the mix 24, the mix 2 may also optionally include an admixture.

Again, the piston plungers 28 are moved substantially vertically in the directions of the illustrated arrows 29 so that the pressing shoes 32 contact, and exert a further and final compacting pressure on, the second mix 2 in the mould cavities 22 such that the two cementitious mixes 24 and 2 are pressed into bonding alignment, with the upper and lower surfaces of the cementitious mix in the mould cavities 22 being formed by the pressing shoes 32 and pallet 26 respectively. This completes the forming of the cementitious product in the mould cavities 22.

Whilst the cementitious mixes 24 and 2 may undergo an initial partial compaction in the mould cavities 22 by the action of the vibration applied to the pallet 26, this vibration is can optionally be continued throughout both the pressing actions of the pressing shoes 32, on the mix 24 and on the mix 2.

Figure 4:
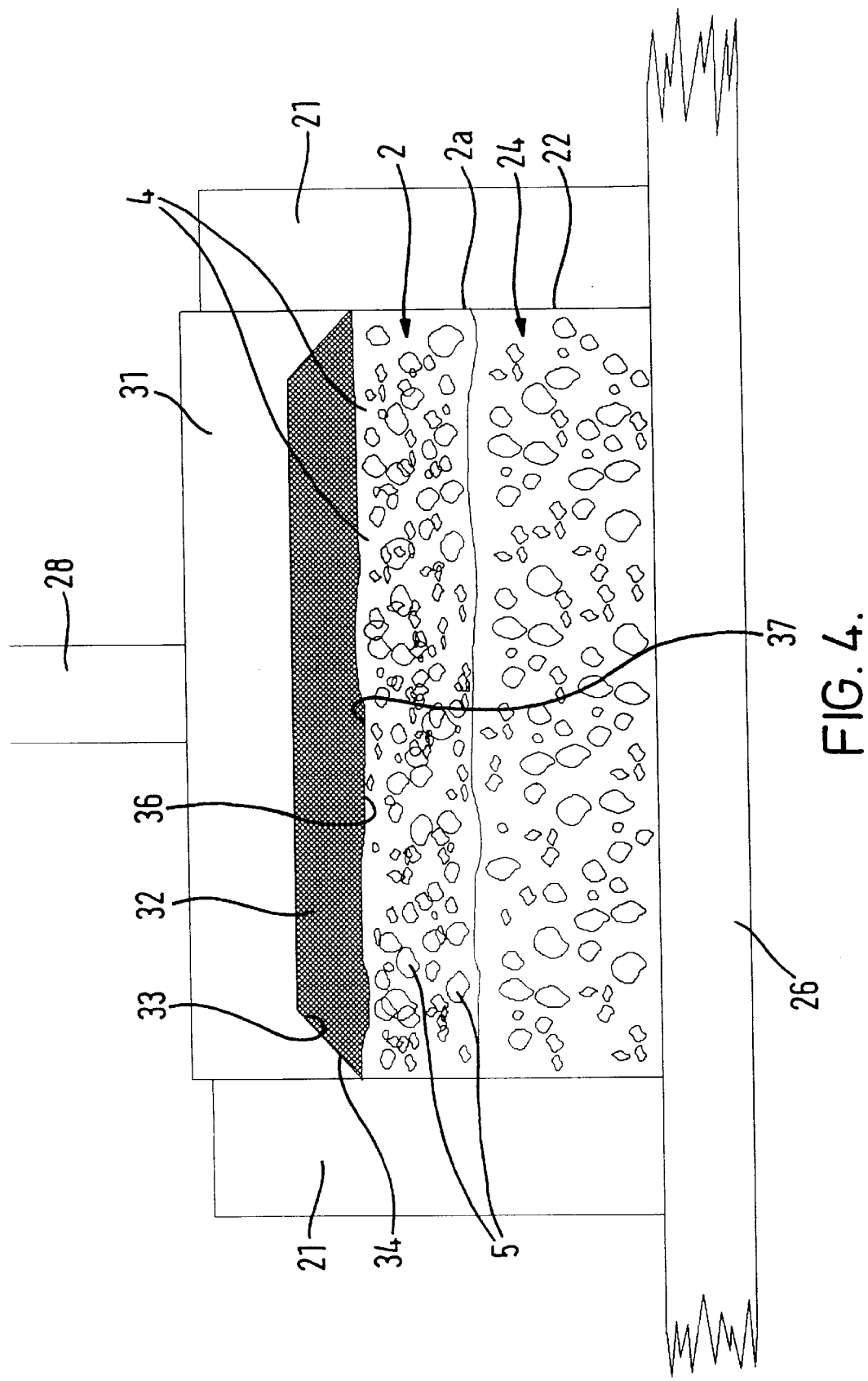
FIG. 4 is a diagrammatic detail sectional view showing compaction of a charge of cementitious mix comprising sand and cement and aggregate particles in a mould cavity by a pressing shoe forming part of the apparatus of FIG. 3.

In FIG. 4 can be seen the action of one pressing shoe 32 where it contacts the partially compacted mix 2 during its pressing movement down a respective mould cavity 22. The material of the pressing shoe 32 initially acts to compact the mix 2 until the large (coarse) aggregate particles 5 are in a close packed arrangement such that further movement of those aggregate particles is no longer possible. Continued pressure applied by the pressing shoe 32 then causes the shoe 32 to deform and, in deforming, its lower surface 36 which is in contact with the upper surface of the mix 37 increases in surface area such that it flows around the uppermost aggregate particles 5 and continues to press upon the uppermost fines 4, driving them into the areas between the aggregate particles 5 that lie within the cementitious mix 2.

Figure 5:
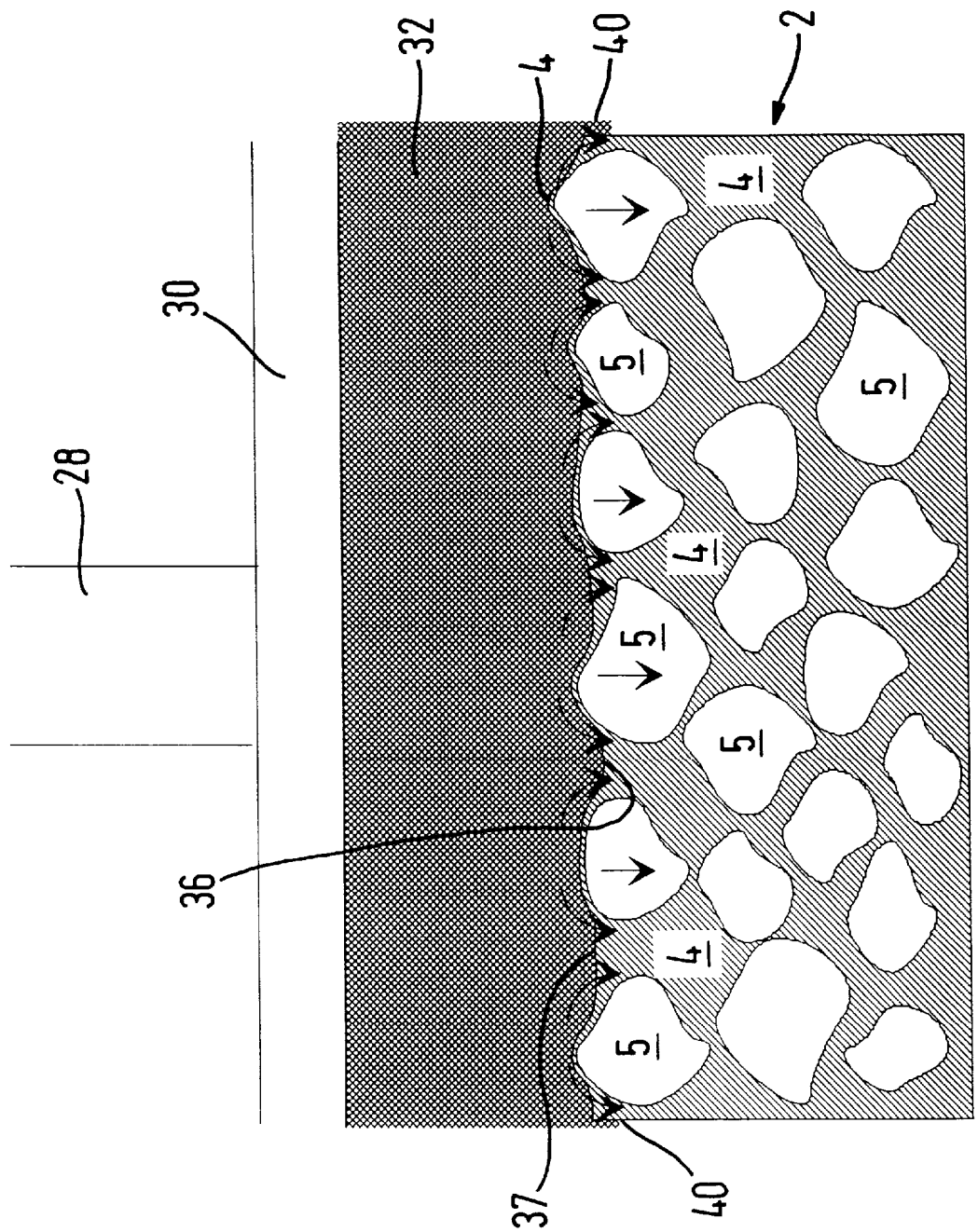
FIG. 5 is a diagrammatic detail sectional view to an enlarged scale showing the pressing action of FIG. 4 on the surface region of the cementitious mix.
Figure 6:
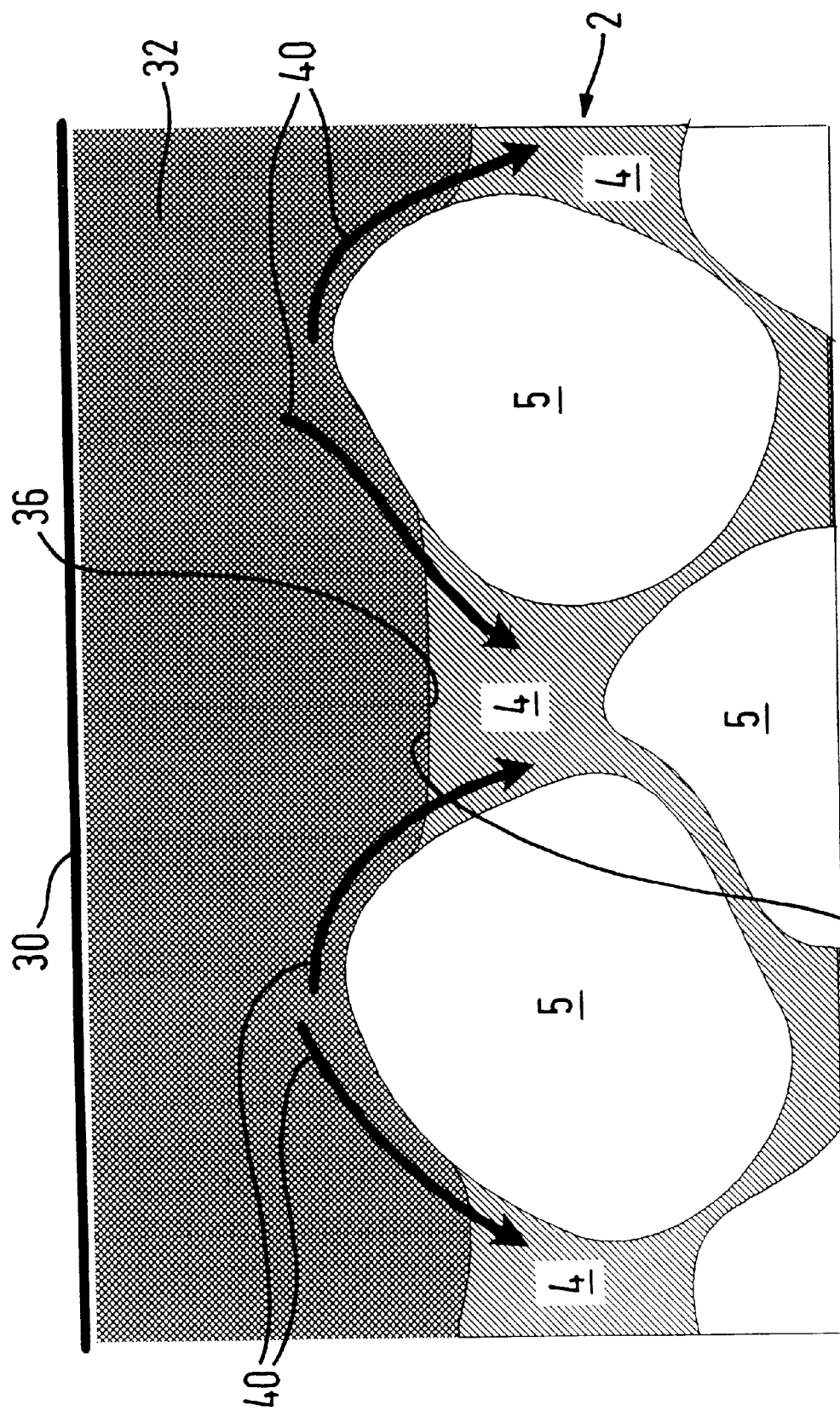
FIG. 6 is a diagrammatic detail view to a greatly enlarged scale showing the effect of the pressing action, with the aggregate particles appearing as spaced apart although they are in fact in a close packed arrangement that can only be seen in a three dimensional view.

The action of the pressing shoe 32 on the cementitious mix 2 is further shown in FIGS. 5 and 6. Referring to FIG.

5 this shows the outer surface 36 of the pressing shoe 32 in contact with the uppermost surface 37 of the mix 2. The downward pressing action of the flowable material of the pressing shoe 32 on the mix 2 initially causes the mix to compact until the large aggregates are in a close packed arrangement and causes the fines 4 to migrate downwards from the mix surface 37. Continued downward pressing action then causes the shoe 32 to deform and the lower surface 36 of the shoe 32 to increase in surface area and to flow around the large aggregate particles 5 as illustrated by the arrows 40 leaving a thin layer of fines 4 pressed over the aggregate particles 5 near the mix surface 37. As can be seen more particularly from FIG. 6, during this migration, the outer surface 36 of the pressing shoe 32 conforms to the surface 37 of the mix 2 and comes into frictional contact with the uppermost aggregate particles 5 and then, in flowing around the surface of the aggregates 5 whilst in frictional contact, effects a cleaning action by removing the thin layer of fines 4 from the aggregate particles 5, as illustrated by the arrows 40.

Figure 7:
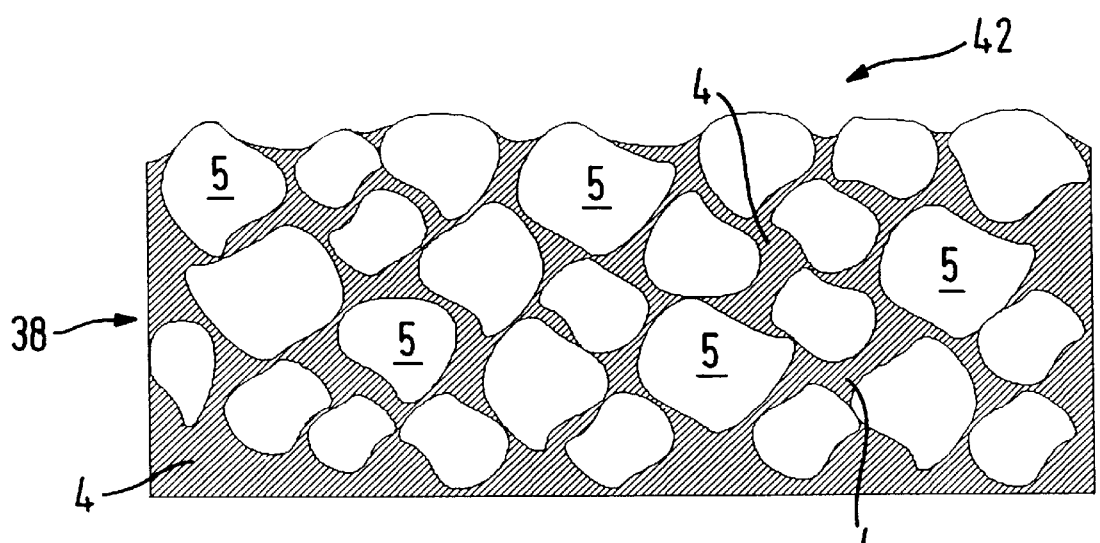
FIG. 7 is a diagrammatic detail view to an enlarged scale of the cementitious mix showing the ultimate effect of the pressing action and after withdrawal of the pressing shoe; with the aggregate particles appearing as spaced apart although they are in fact in a close packed arrangement that can only be seen in a three dimensional view.

The formed (pressed) green cementitious block 38 shown in FIG. 7 is then removed from the mould cavity 22 by raising the mould whilst holding the shoe 32 and pallet 26 in stationary alignment. The pallet 26 containing the pressed block 38 is then lowered onto a conveyor (not shown) on which it is conveyed to a curing location for curing. Thus, by virtue of the cleaning action of the pressing shoe 32, the block 38 has an exposed surface finish 42 in which the aggregate particles 5 project proud of the exposed surface of the block, with the fines 4 having been driven into the areas between the aggregate particles 5.

Figure 8:
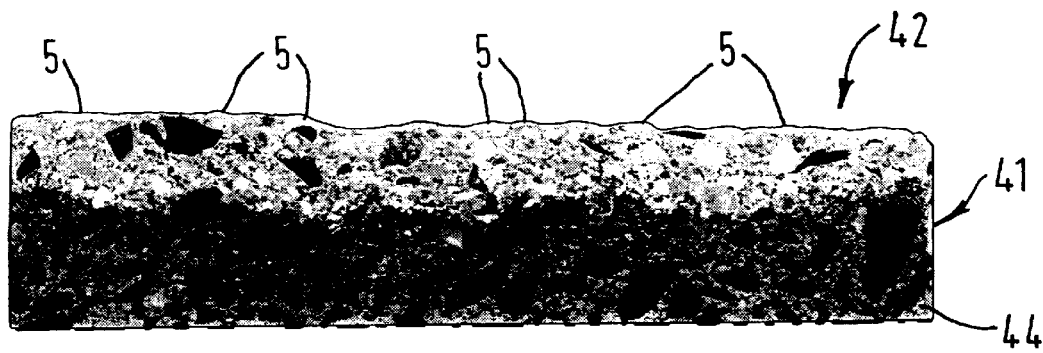
FIGS. 8 and 9 are photomicrographs from one side and above respectively of a part of a cementitious paving product, made in accordance with the invention by the apparatus of FIGS. 3 to 5 and showing more clearly the close packed arrangement of aggregate particles.
Figure 9:
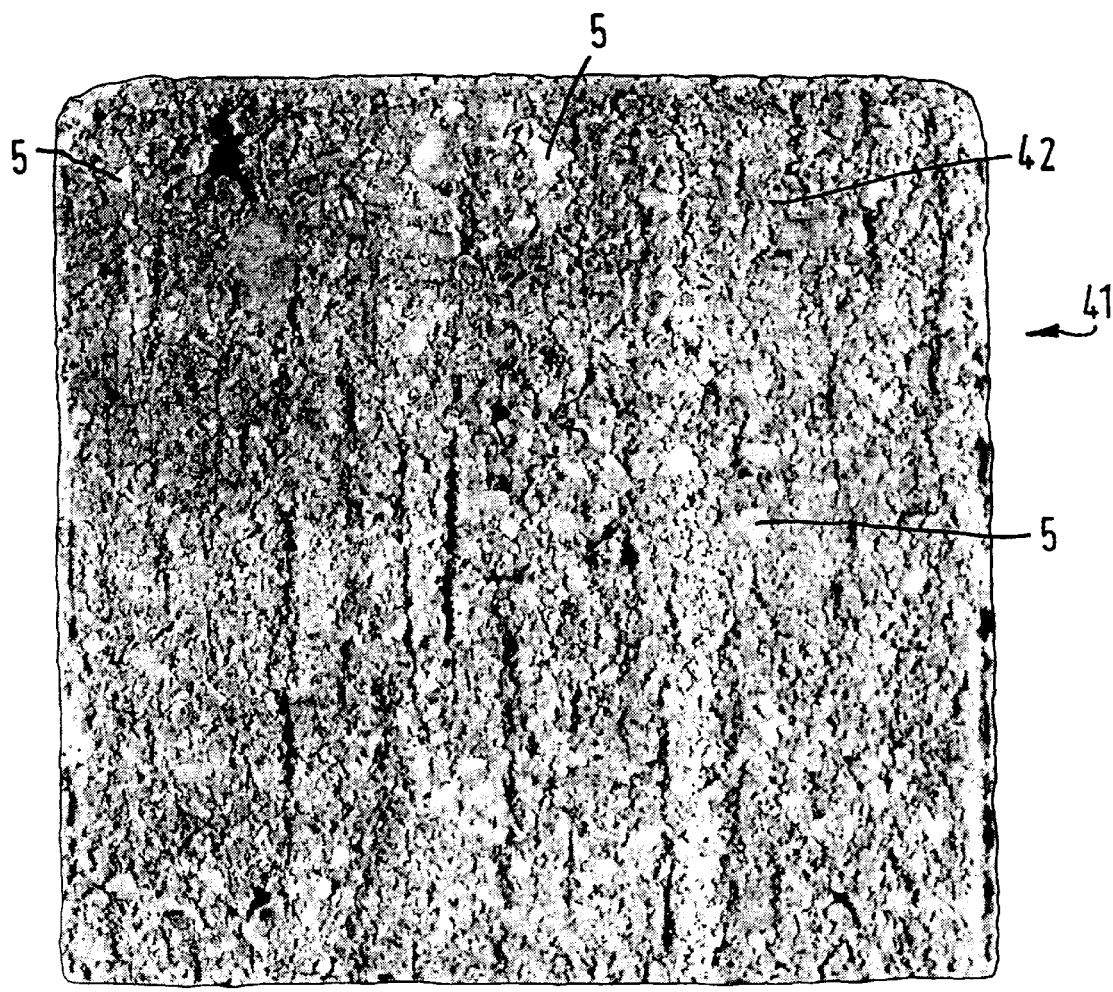

Portions of an actual paving product 41 made by the apparatus of FIGS. 3 to 5 are illustrated in FIGS. 8 and 9 in side and plan views respectively. There is the exposed surface finish 42 with the aggregate particles 5 standing proud of the exposed surface of the paving product to simulate the surface and aspect of natural stone without the exposed surface having been subjected to any secondary processing. Paving product 41 has a base layer 44 which has been formed of the cementitious mix 24 and a top layer 45 formed of the cementitious mix 2.

Figure 10:
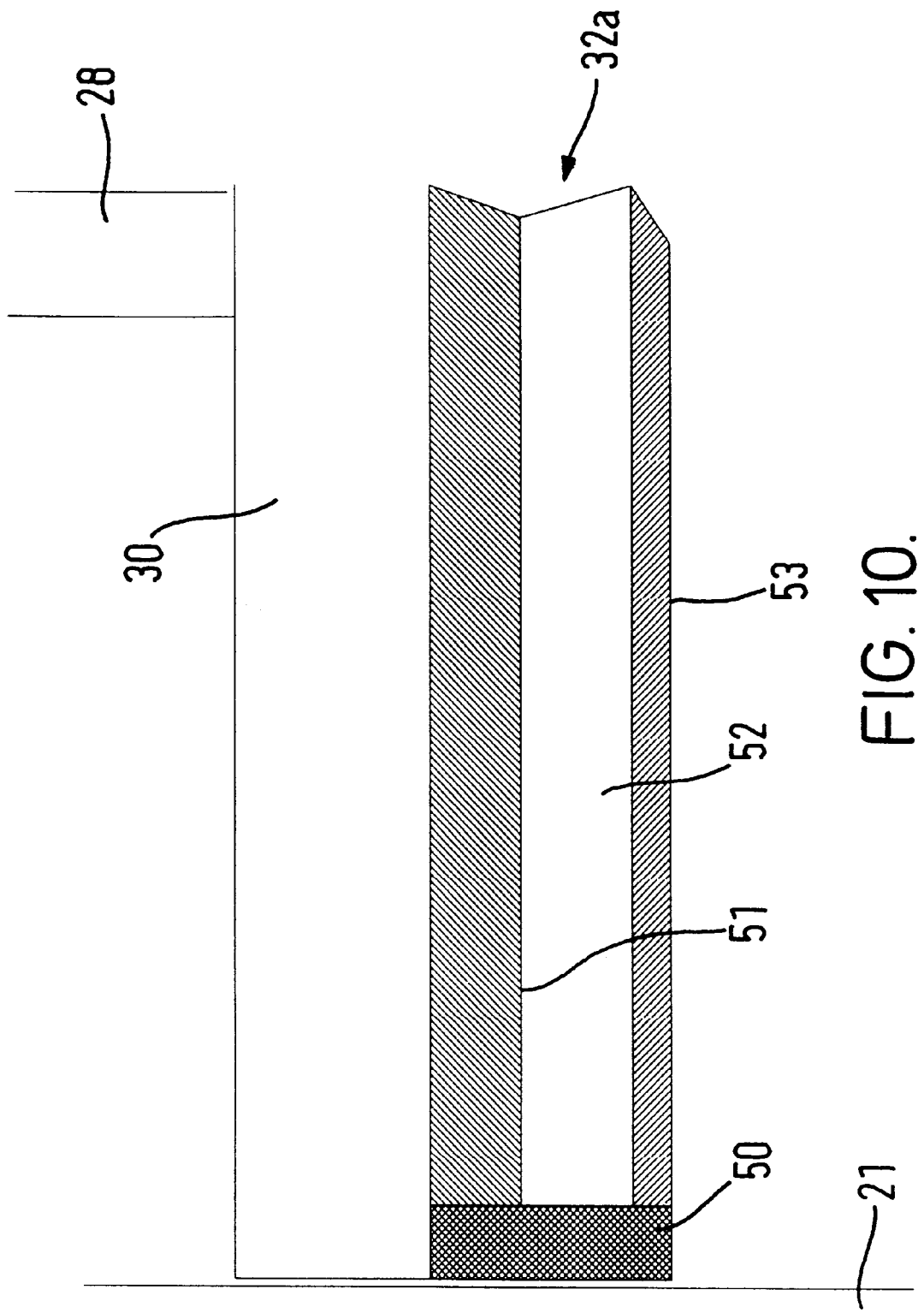
FIG. 10 is a diagrammatic detail view of an alternative embodiment of pressing/stripper shoe comprising a composite flowable mass incorporating more than one material and/or layers of material and having a peripheral region made from a similar or different material that is bondable with the flowable mass.

Referring to FIG. 10, the pressing/stripper shoe 32a differs from that of FIGS. 3 to 5 in that it comprises a composite flowable mass which is affixed to the metal holder 30. The intermediate layer/s 52 may advantageously be a liquid, a gas, a gel or a particulate material such as sand. The side peripheral edges 50 of the shoe 32a are made from either a flowable or hard material and are generally in frictional contact within the mould cavity with the mould walls 21. Affixed to both the peripheral edge 50 and the holder 30 is a first layer 51 made from either the same or another suitable flowable and/or hard material as that used for the peripheral edge 50. Again affixed to the side peripheral edge 50 of the shoe 32a at its lower extremity is a further layer 53 of suitable flowable material which will make contact with the upper surface 37 of the cementitious mix 2 (FIG. 4). The layer 53 may be affixed to the first layer 51, or be held in frictional contact therewith, or may be spaced apart with one or more intermediate layers 52 which again may be affixed or held in frictional contact. Since the peripheral edge 50 and the first and lower layers 51 and 53 can form a sealed envelope comprising an intermediate layer in the form a liquid, a gas, a gel or a particulate material there is no need to provide the outwardly flared and peripheral bevelled parts 33 and 34 respectively.

The present invention may be embodied in other specific forms without departing from the spirit or essential attributes thereof and, accordingly, reference should be made to the appended claims rather than the foregoing specification as indicating the scope of the invention. For example, instead of the formed product being made of a cementitious mix, mixes of other materials having fine and coarse particles such as a mix of fine particles of clay and coarse aggregate particles may be used. The mix may comprise aggregates and a resin, or the binder may be a material other than cement such as gypsum. So the use of the term "cementitious mix" in this specification also covers such alternative mixes.

Furthermore, although it is preferred for reasons of cost and efficiency, for the flowable mass to be carried by the piston plungers 28, the flowable mass could be carried by the pallet 26 alternatively or in addition to the plungers 28. In a further alternative, a flowable mass may be used to form collapsible side walls to the mould such that side pressing is effected.

The pressing surface 36 of the pressing shoe 32, although being generally planar in the described embodiment, may be provided with any suitable kind of pattern to provide a decorative and/or skid resisting surface finish to the exposed surface of the formed cementitious product, or to incorporate features such as signage, lettering, logos etc.

Moreover, although the pressing operation has been described with reference to the use of two cementitious mixes, a unitary cementitious mix, or a composite of more than two cementitious mixes may be used if desired or required.

Finally, the fact that the pressing operation has been described to replace or eliminate the need for secondary processing does not mean that secondary processing is excluded because it may be desirable to incorporate a secondary process such as light washing, or spraying with an acrylic latex the further to enhance the simulated surface and aspect of natural stone.

What is claimed is:

1. A method of manufacturing a cementitious product having exposed aggregate coarse particles, said method comprising the steps of:

preparing a cementitious mix incorporating fine particles including sand and cement, aggregate coarse particles and water; and pressing a flowable mass against a surface of said cementitious mix to clean fine particles from aggregate coarse particles adjacent to said surface of the cementitious mix and to form a pressed cementitious product of which said surface has cleaned exposed aggregate coarse particles standing proud of said fine particles.

2. A method as claimed in claim 1, wherein said flowable mass is a resilient material selected from the group consisting of plastics, synthetic and nature rubbers, elastomers, and laminates.

3. A method as claimed in claim 1, wherein said flowable mass is a flexible membrane filled with a material selected from the group consisting of a liquid, a gas, a gel, and a particulate material.

4. A method as claimed in claim 1, wherein said flowable mass is a composite of materials selected from the group consisting of plastics, synthetic and nature rubbers, elastomers, and laminates.

5. A method as claimed in claim 1, further comprising the step of cleaning said flowable mass after said pressing step.

6. A method as claimed in claim 1, further comprising the step of cleaning said flowable mass after said pressing step with an air knife.

7. A method as claimed in claim 1, further comprising the step of vibrating said cementitious mix.

8. A method as claimed in claim 1, further comprising the step of providing a pressing surface, and using said pressing surface to press said cementitious mix with said flowable mass.

9. A method as claimed in claim 1, further comprising the step of providing a pressing apparatus having a pressing member with a recess, wherein said pressing member accommodates said flowable mass in said recess and said flowable mass has an inwardly facing bevel extending around its outer periphery.

10. A method as claimed in claim 9 wherein said pressing member further includes a peripheral region around said flowable mass formed of a different material then said flowable mass.

11. A method as in claim 8, wherein said surface is a first surface, said cementitious mix has a second surface, and said pressing surface presses against said second surface of said cementitious mix to press said flowable mass against said first surface of said cementitious mix.

12. A method of manufacturing a cementitious product having exposed aggregate coarse particles, said method comprising the steps of:

preparing a cementitious mix incorporating fine particles including sand and cement, aggregate coarse particles and water;

pressing a flowable mass against a surface of said cementitious mix;

said flowable mass:

initially acting to compact said cementitious mix until the aggregate course particles are in a close packed arrangement; and further acting by applying continued pressure that deforms said flowable mass causing said flowable mass to flow around uppermost aggregate coarse particles and uppermost fine particles to be driven into areas between said aggregate coarse particles;

whereby to clean fine particles from aggregate coarse particles adjacent to said surface of the cementitious mix and to form a pressed cementitious product of which said surface has cleaned exposed aggregate coarse particles standing proud of said uppermost fine particles.

\* \* \* \* \*